UNITED STATES PATENT OFFICE.

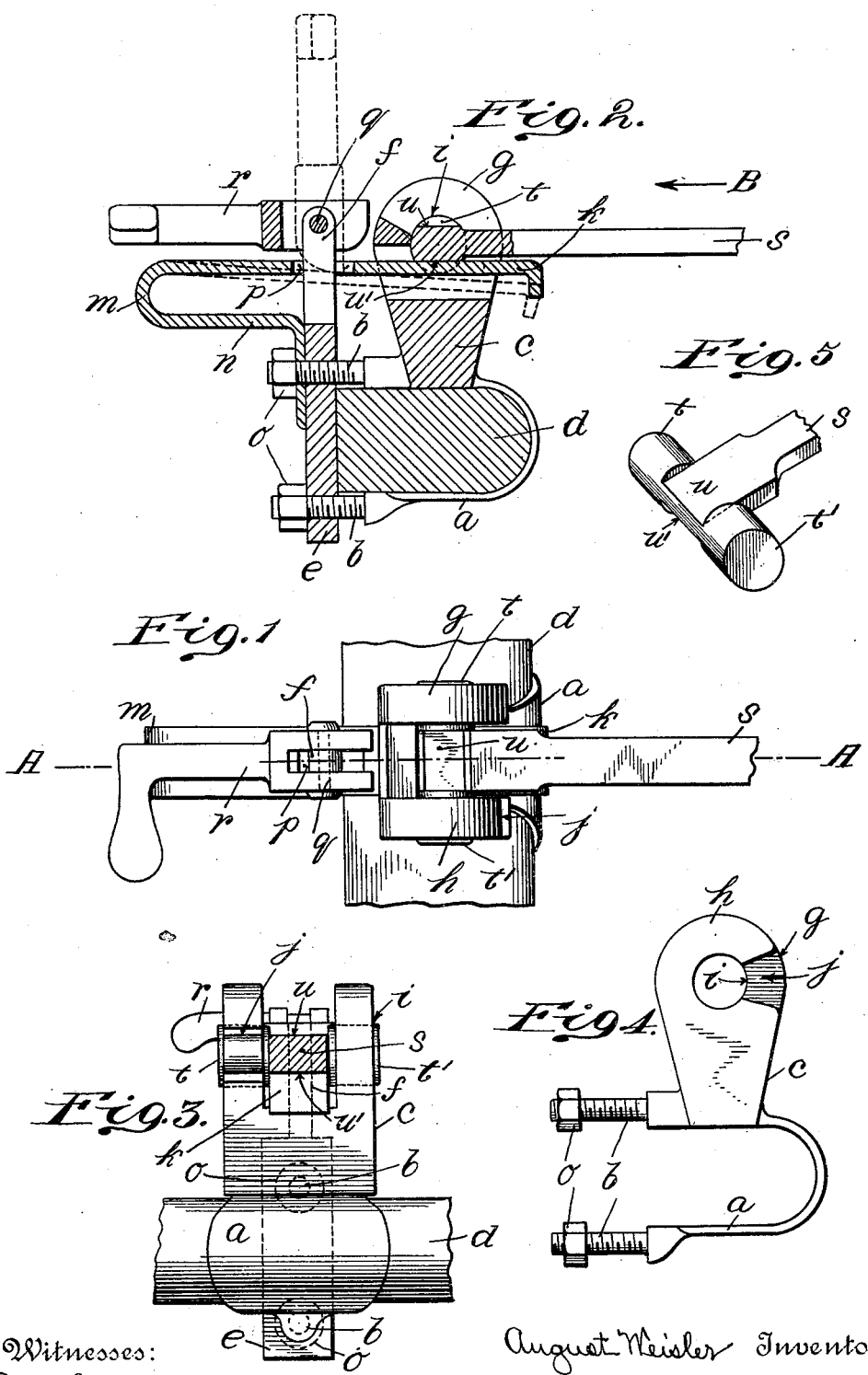

AUGUST WEISLER, OF PERRYVILLE, MISSOURI, ASSIGNOR OF ONE-HALF TO EDWARD ROBB, OF PERRYVILLE, MISSOURI.

VEHICLE-COUPLING.

934,250.  Specification of Letters Patent.  Patented Sept. 14, 1909.

Application filed May 6, 1909. Serial No. 494,388.

*To all whom it may concern:*

Be it known that I, AUGUST WEISLER, a citizen of the United States, residing at Perryville, in the county of Perry and State of Missouri, have invented certain new and useful Improvements in Vehicle-Couplings, of which the following is a specification, reference being had to the accompanying drawings.

My invention relates to improvements in devices for coupling shafts, poles, thills and the like to road vehicles; and an object of my invention is to provide a device of the character described which will prove simple in construction, comparatively cheap in manufacture and most efficient in use.

Another object of my invention is to provide a device of the character described which will prevent rattling of the pole, and which will admit of the ready attachment and detachment of the pole.

In the drawings illustrating the principle of my invention and the best mode now known to me of applying that principle, Figure 1 is a plan view of my new coupling in position; Fig. 2 is a section on the line A—A of Fig. 1; Fig. 3 is a front view looking in the direction of the arrow B of Fig. 2; Fig. 4 is a detail showing the clip in elevation; and Fig. 5 is a detail showing the pole-end in perspective.

The clip $a$ is formed with a pair of threaded shanks $b$ and a pole-bracket $c$. The clip $a$ passes over the axle $d$ and its threaded shanks $b$ pass through holes in the base-plate $e$ which is formed with a post $f$. The pole-bracket $c$ is formed with a pair of ears $g$, $h$. The ear $g$ is formed with an eye $i$ while the ear $h$ is formed with a keyhole-shaped recess or open-ended slot $j$ (Fig. 4). Between the ears $g$, $h$, of the pole-bracket extends the free arm $k$ of the leaf-spring $m$, the other arm $n$ of which is formed with a hole through which passes one of the threaded-shanks $b$. The clip $a$, the axle $d$, the base-plate $e$ and leaf-spring $m$ are held in assembled relation by the nuts $o$, which engage the threaded ends of the shanks $b$ and hold the base-plate $e$ against the axle $d$. The arm $k$ of the leaf-spring $m$ is formed with an aperture $p$ through which projects the post $f$ from the base-plate $e$, in the end of which post is mounted free to rotate on the pivot-pin $q$ the cam-latch $r$. When the latter is swung to the dotted line position shown in Fig. 2, the arm $k$ of the leaf-spring $m$ is depressed so as to permit the insertion of the end of the pole $s$, which is formed with laterally-extending studs $t$, $t'$, and between the latter with recesses $u$, $u'$, so that the end of the pole $s$, between the studs $t$, $t'$, is so cut away as to permit this reduced portion of the pole-end to pass readily through the opening in the recess $j$ of the ear $h$. The pole-end is then moved laterally so as to bring the stud $t$ into the eye $i$ and the stud $t'$ into the circular portion of the recess $j$. In this position, the arm $k$ of the leaf-spring $m$ lies under the recess $u'$. The cam-latch $r$ is thrown to the full-line position of Fig. 2, whereupon the arm $k$ of the leaf-spring $m$ enters the recess $u'$ and holds the pole-end firmly in place and prevents its rattling. To remove the shaft or pole, the cam-latch $r$ is thrown to the dotted line position of Fig. 2, thereby forcing the arm $k$ of the leaf-spring $m$ out of the recess $u'$. The pole $n$ is then moved laterally to bring the reduced portion into the recess $j$, whereupon the pole may be readily removed from the bracket.

I claim:

1. The combination with a pole-end having laterally-extending studs and formed with a reduced portion therebetween, of a pole-bracket having ears one of which is formed with an eye and the other of which is formed with a recess through which said reduced portion may be passed, one of said studs being adapted to fit in said eye and the other of said studs being adapted to fit in said recess; a yielding device which extends between said ears and bears against said reduced portion; and means for moving said yielding device to release said pole-end.

2. The combination with a pole-end having laterally-extending studs and formed with a reduced portion therebetween, of a pole-bracket having ears one of which is formed with an eye and the other of which is formed with a recess through which said reduced portion may be passed, one of said studs being adapted to fit in said eye and the other of said studs being adapted to fit in said recess; a yielding device which extends between said ears and bears against said pole-end; and a movable cam device which in one position presses said yielding device against the tension thereof out of engagement with said pole-end and in another position allows said yielding device to press against said pole-end to retain the same in place and to prevent rattling.

In testimony whereof, I hereunto set my hand at said Perryville, this 1st day of May, A. D. 1909, in the presence of the two undersigned witnesses.

AUGUST WEISLER.

Witnesses:
    CHAS. J. PALISCH,
    LEON LITROBE.